(12) United States Patent
Miller et al.

(10) Patent No.: US 10,166,421 B2
(45) Date of Patent: Jan. 1, 2019

(54) COGNITIVE SOLUTION TO ENHANCE FIREFIGHTING CAPABILITIES

(71) Applicant: International Business Machines Corporation, Armonk, NY (US)

(72) Inventors: Brent A. Miller, Cary, NC (US); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/857,944

(22) Filed: Dec. 29, 2017

(65) Prior Publication Data

US 2018/0318622 A1 Nov. 8, 2018

Related U.S. Application Data

(63) Continuation of application No. 15/584,420, filed on May 2, 2017.

(51) Int. Cl.
*A62C 99/00* (2010.01)
*G06N 5/02* (2006.01)

(52) U.S. Cl.
CPC ......... *A62C 99/0081* (2013.01); *G06N 5/022* (2013.01)

(58) Field of Classification Search
USPC ........................................................ 706/45
See application file for complete search history.

(56) References Cited

U.S. PATENT DOCUMENTS

| | | | |
|---|---|---|---|
| 6,556,981 B2 | 4/2003 | Pedersen et al. | |
| 6,594,700 B1 * | 7/2003 | Graham | H04L 29/06 709/219 |
| 6,654,814 B1 * | 11/2003 | Britton | G06F 17/30905 707/E17.121 |
| 7,406,313 B2 * | 7/2008 | Lynch, Jr. | H04W 4/21 455/444 |
| 7,490,095 B2 * | 2/2009 | Labadie | G06N 5/02 |
| 7,603,714 B2 * | 10/2009 | Johnson | G06F 21/577 709/223 |
| 7,686,090 B2 * | 3/2010 | Reimert | E21B 43/10 166/382 |
| 7,793,151 B2 * | 9/2010 | Miller | G06F 11/079 706/48 |
| 8,023,940 B2 * | 9/2011 | Lynch, Jr. | H04W 4/21 455/432.2 |
| 8,905,152 B2 | 12/2014 | Kling et al. | |

(Continued)

OTHER PUBLICATIONS

Public Education: The Fire Service and Social Media: Time to Get Engaged, The Fire Service and Social Media: Time to Get Engaged Feb. 27, 2013, by Blake Scott, pp. 1-5.*

(Continued)

*Primary Examiner* — Michael B Holmes
(74) *Attorney, Agent, or Firm* — Michael Purdham

(57) ABSTRACT

A computer identifies, based on sensor data from one or more sensors located in proximity to a fire site and on a corpus of firefighting knowledge, one or more firefighting goals. The computer generates, based on the one or more firefighting goals and the corpus of firefighting knowledge, one or more firefighting recommendations. The computer scores, using the corpus of firefighting knowledge, the one or more firefighting recommendations based on historical effectiveness of prior firefighting actions.

1 Claim, 5 Drawing Sheets

(56) References Cited

U.S. PATENT DOCUMENTS

| | | | |
|---|---|---|---|
| 9,230,209 B2* | 1/2016 | Labadie | G06N 5/02 |
| 9,367,358 B2* | 6/2016 | Britton | G06Q 10/10 |
| 9,442,697 B2* | 9/2016 | Miller | G06F 8/10 |
| 10,037,429 B1* | 7/2018 | Rodriguez Bravo | H04L 63/105 |
| 2010/0287551 A1* | 11/2010 | Miller | G06F 8/10 718/100 |
| 2012/0261144 A1 | 10/2012 | Vian et al. | |
| 2015/0112159 A1* | 4/2015 | He | G06F 21/00 600/301 |
| 2015/0131262 A1 | 5/2015 | Mabry, Jr. et al. | |
| 2015/0242787 A1 | 8/2015 | Bernstein et al. | |
| 2016/0081415 A1 | 3/2016 | Handshaw et al. | |
| 2017/0209725 A1 | 7/2017 | Hu et al. | |

OTHER PUBLICATIONS

Realizing the Vision of Smart Fire Fighting, Casey C. Grant; Albert Jones; Anthony Hamins; Nelson Bryner, IEEE Potentials ( vol. 34, Issue: 1, Jan.-Feb. 2015 ) pp. 35-40 IEEE Potentials.*

ScienceDirect Elsevier Computers, Environment and Urban Systems vol. 50, Mar. 2015, pp. 30-40 Spatiotemporal and semantic information extraction from Web news reports about natural hazards Wei Wang, Kathleen Stewart.*

Novel cost effective multi sensor network for the protection of national parks and wildlife from fire, Baldeep Singh; Shailendra Kumar; Vishal Singh Chandel; Syed Hasan Saeed ; Md. Yunus Waheed, 2017 4th IEEE Uttar Pradesh Section International Conference on Electrical, Computer and Electronics pp. 107-112.*

Fire Management Today Vlume 75 • No. 1 • 2017 Weather Effects on Smoke and Wildland Fire United States Department of Agriculture Forest Service (USDA) pp. 1-59.*

Fern et al., "A functional goal decomposition of urban firefighting", Proceedings of the 5th International ISCRAM Conference—Washington, DC, USA, May 2008. 10 pages, <http://www.iscram.org/legacy/dmdocuments/ISCRAM2008/papers/ISCRAM2008_Fern_etal.pdf>.

Fox, "The Future of Smart Firefighting: Integrating All the Data", Public Safety & Homeland Security, Jun. 1, 2015. 5 pages, <http://www.govtech.com/em/safety/The-Future-Smart-Firefighting-Integrating-All-the-Data.html>.

Haciomergolu, "C-Thru Smoke Diving Helmet: Future Vision of Fire Fighting Equipment", Tuvie, 2017. Last accessed Mar. 17, 2017. 13 pages, <http://www.tuvie.com/c-thru-smoke-diving-helmet-future-vision-of-fire-fighting-equipment-by-omer-haciomeroglu/>.

Hamins et al., "Research Roadmap for Smart Fire Fighting", NIST Special Publication 1191, May 2015. 247 pages.

Miller et al., "Cognitive Solution to Enhance Firefighting Capabilities", U.S. Appl. No. 15/584,420, filed May 2, 2017.

List of IBM Patents or Patent Applications Treated as Related. Filed Jan. 2, 2018. 2 pages.

* cited by examiner

COGNITIVE SOLUTION TO ENHANCE FIREFIGHTING CAPABILITIES

BACKGROUND

The present disclosure generally relates to firefighting improvement, and more specifically, to a cognitive system utilizing machine learning and cognitive techniques to assist firefighters with expert advice.

Current methods for firefighting rely upon water as a primary way to extinguish fires and require vast quantities of water. Often, the amount of water available is limited and therefore it is important to use water efficiently. The efficiency with which a firefighter uses water in extinguishing fires is currently largely based upon the experience and training of the firefighter, with less experienced firefighters using more water than senior firefighters. The efficiency of a firefighter also impacts other aspects than water usage, including time required to extinguish the fire, resultant property damage, and the safety of the firefighter.

SUMMARY

Disclosed herein are embodiments of a method and computer program product for improving firefighting. A computer identifies, based on sensor data from one or more sensors located in proximity to a fire site and on a corpus of firefighting knowledge, one or more firefighting goals. The computer generates, based on the one or more firefighting goals and the corpus of firefighting knowledge, one or more firefighting recommendations. The computer scores, using the corpus of firefighting knowledge, the one or more firefighting recommendations based on historical effectiveness of prior firefighting actions.

Also disclosed herein are embodiments of a system for improving firefighting. A network interface receives sensor data from one or more sensors located in proximity to a fire site. One or more processors are communicatively coupled to the network interface, and the one or more processors are configured to analyze data from the one or more sensors located in proximity to a fire site. A memory is communicatively coupled to the one or more processors, and the memory stores a corpus of firefighting knowledge. The memory comprises instructions which, when executed by the one or more processors, cause the one or more processors to perform analytics on the sensor data and the corpus of firefighting knowledge. The instructions also cause the one or more processors to identify, based on the sensor data and the corpus of firefighting knowledge, one or more firefighting goals. Based on the one or more firefighting goals and the corpus of firefighting knowledge, the system generates one or more firefighting recommendations. Using the corpus of firefighting knowledge, the system scores the one or more firefighting recommendations based on historical effectiveness of prior firefighting actions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
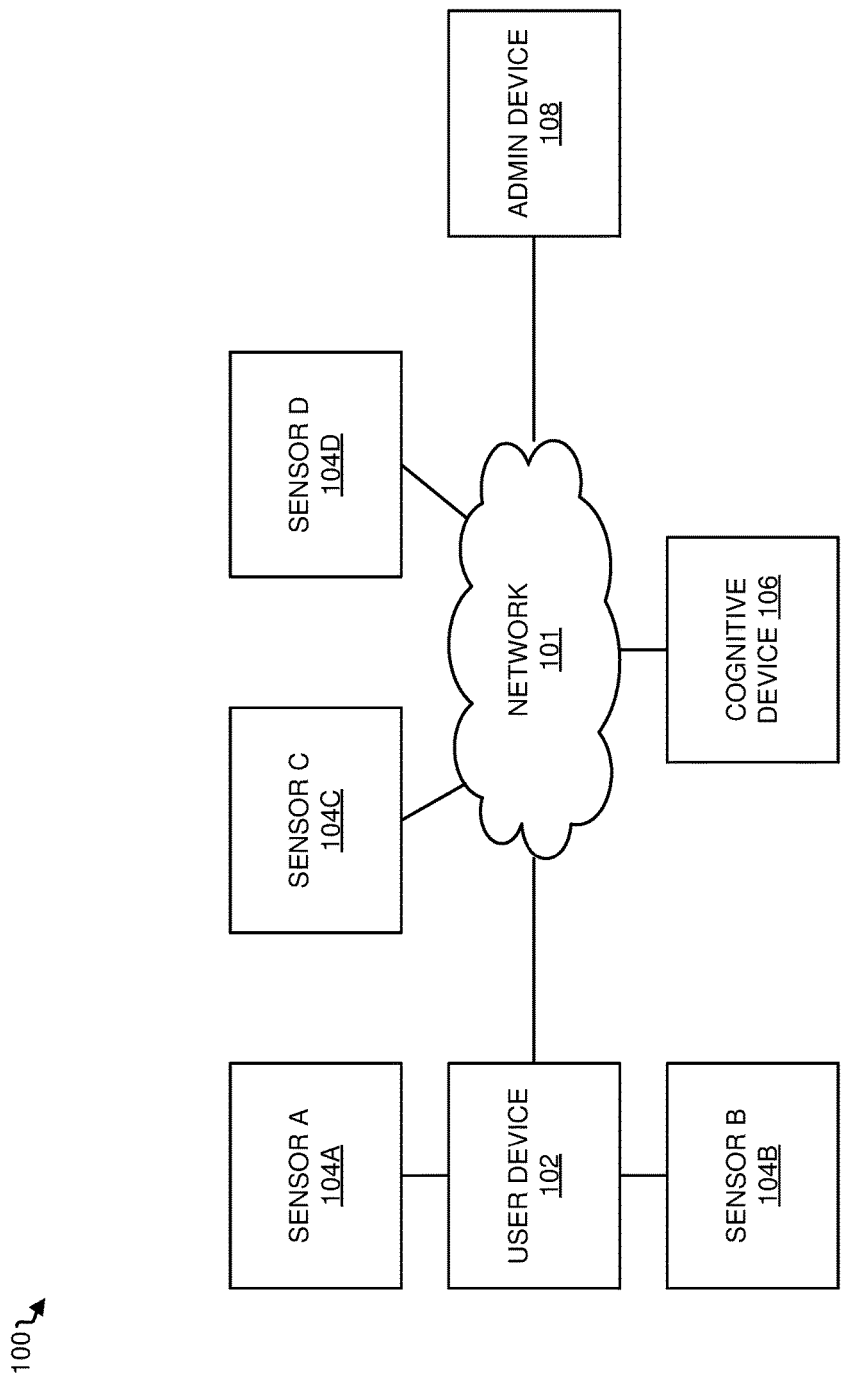
FIG. 1 illustrates a block diagram of an example system in which some embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to firefighting improvement, and more particular aspects relate to cognitive solutions utilizing machine learning and cognitive techniques to assist firefighters with expert advice to conserve water and hasten extinguishing of fires. While the present disclosure is not necessarily limited to such applications, various aspects of the disclosure can be appreciated through a discussion of various examples using this context. Aspects of the present disclosure can also be used with other improvements in firefighting resources or outcomes including usage of chemicals other than water.

Current methods for firefighting rely upon water as a primary way to extinguish fires and require vast quantities of water. Often, the amount of water available is limited and therefore it is important to use water efficiently. The efficiency with which a firefighter uses water in extinguishing fires is currently largely based upon the experience and training of the firefighter, with less experienced firefighters using more water than senior firefighters. The efficiency of a firefighter also impacts other aspects than water usage, including time required to extinguish the fire, resultant property damage, and the safety of the firefighter. In order to improve the ability of firefighters to extinguish fires efficiently, a cognitive system can be developed and used. Such a tool will employ machine learning methods and improve over time to increase efficiency gains. Through use of this tool, firefighters can use water (or other chemicals) more efficiently, extinguish fires faster, reduce property damage caused by fires, and improve their safety.

The present disclosure provides for a cognitive system to improve firefighting. In order to improve firefighting, a collection of sensors can be used to gather real time data to input into a cognitive system. Such sensors can include, but are not limited to, temperature sensors, humidity sensors, radiation sensors, other atmospheric monitoring sensors, pressure (air, water, or other) sensors, local positioning sensors, accelerometers, cameras (either still picture or video recording), audio sensors, breathing apparatus sensors, or sensors monitoring a firefighter's health or condition. It is to be understood that the sensors mentioned above are provided by way of example and that the collection of sensors can include any other sensors which may provide useful information for improving firefighting. The cognitive system can also include a user device which receives the data from the sensors and performs various tasks, including, but not limited to, analyzing and utilizing that data. The user device can also be configured to perform other tasks such as, but not limited to, managing the sensors, processing the data, displaying the data, managing communications, and receiving additional data from other sources. In some embodiments, the user device contains mechanisms to automatically implement directions from the cognitive system, for example: automatically adjusting the output pressure of a hose, changing the angle of spray, or changing a nozzle used. The cognitive system can also include a cognitive device which accepts input from the user device, external feeds, historical data, and human inputs. The cognitive device can also accept input directly from the sensors in some embodiments. The cognitive device can include an analytics module which can generate trends and best practices and a cognitive engine which can learn and improve the cognitive system over time, including through use of a scoring system. The cognitive system can use the input from the sensors and a corpus of firefighting knowledge to identify a firefighting goal. The cognitive system can create and provide various outputs, including real time recommendations for use by firefighters to achieve the firefighting goal, historical information, detailed information about the scoring system, and information including analytics and trends. In some embodiments, the cognitive system can output directions to a user device instead of, or in addition to, the recommendations. The cognitive system can also include an admin device which an admin can use to input criticism, alternative recommendations, alternative scoring, or other input to improve the firefighting recommendations generated and scored by the cognitive device.

The aforementioned improvements and/or advantages of using water (or other chemicals) more efficiently, extinguishing fires faster, reducing property damage caused by fires, and improving firefighter safety are example improvements and/or advantages. These improvements and/or advantages are a non-exhaustive list of example advantages. Embodiments of the present disclosure exist which can contain none, some, or all of the aforementioned advantages and/or improvements.

Referring now to FIG. 1, depicted is a block diagram of an example cognitive system 100 in which some embodiments of the present disclosure can be implemented. Network 101 communicatively couples user device 102 to sensor C (104C) and sensor D (104D), cognitive device 106, and admin device 108 via a physical or wireless connection. Network 101 can be as large as the internet, or can be a smaller network such as a wide area network (WAN), metropolitan area network (MAN), an intranet for a firefighting company or other organization, or any other form of network.

Also shown are sensor A (104A) and sensor B (104B) which connect to user device 102 without utilizing network 101. Sensors A-D (104A through 104D) can be temperature sensors, humidity sensors, radiation sensors, other atmospheric monitoring sensors, pressure (air, water, or other) sensors, local positioning sensors, accelerometers, cameras, video recording, audio sensors, breathing apparatus sensors, sensors monitoring a firefighter's health or condition, or any other sensors which may provide useful information for improving firefighting. The number and type of sensors involved will vary in embodiments and the fact that four sensors (104A through 104D) are depicted in FIG. 1 is for representative purposes only. There can be any number of sensors and any number of which can be connected directly to user device 102 and/or any number of which can be connected through network 101. Additionally, any number of sensors can be connected to one or more devices through another network (not depicted).

User device 102 can be a device used by a firefighter or other person at the scene of a fire. In some embodiments, user device 102 can gather, store, and/or analyze data from some or all of sensors A-D (104A through 104D). User device 102 can also display data to its user, including data from one or more of sensors A-D (104A through 104D), firefighting recommendations, or any other data generated or obtained by cognitive system 100. An example user device is described in more detail below with respect to FIG. 2.

Cognitive device 106 can be a device that applies machine learning and cognitive techniques to assist firefighters with expert advice. Cognitive device 106 can accept as inputs any or all of data from user device 102, from one or more of sensors A-D (104A through 104D) (either directly or through user device 102), from admin device 108, from external sources (such as from news reports or weather reports), from historical data, and/or from any other pertinent sources. Cognitive device 106 can also access a corpus of firefighting knowledge which comprises previously received data and inputs, previously generated firefighting recommendations, and previously received feedback. Cognitive device 106 can contain an analytics module, which performs analytics based on inputted data to generate trends or best practices, or otherwise perform these functions. Cognitive device 106 can contain a cognitive engine which employs machine learning to improve over time. Cognitive device 106 can output firefighting recommendations or directions based on inputted data and the corpus of firefighting knowledge and use a scoring system based on inputted data and machine learning to present the best firefighting recommendations based on those recommendations having the highest score (or in some embodiments, the lowest score). Cognitive device 106 can additionally output data on analytics or trends, or other data generated or obtained by the cognitive device. An example cognitive device is described in more detail below with respect to FIG. 3.

Admin device 108 can be a device which displays the outputs of cognitive device 106 to an administrator, expert firefighter, or other individual (collectively referred to herein as an admin). Admin device 108 can accept feedback, such as, but not limited to, criticism, alternative recommendations, alternative scoring, or other input, from an admin to improve the firefighting recommendations generated and scored by cognitive device 106. Admin device 108 can be used in real time to adjust firefighting recommendations from cognitive device 106, at a later time (such as during a review of the outcomes of a firefighting mission), and/or before firefighting missions with example input to train the cognitive device 106. An example admin device is described in more detail below with respect to FIG. 4.

In some embodiments, user device 102 is consistent with user device 200, cognitive device 106 is consistent with cognitive device 300, and/or admin device 108 is consistent with admin device 400. In some embodiments, a device or devices can combine features of two or more of user device 102, cognitive device 106, and admin device 108.

Figure 2:
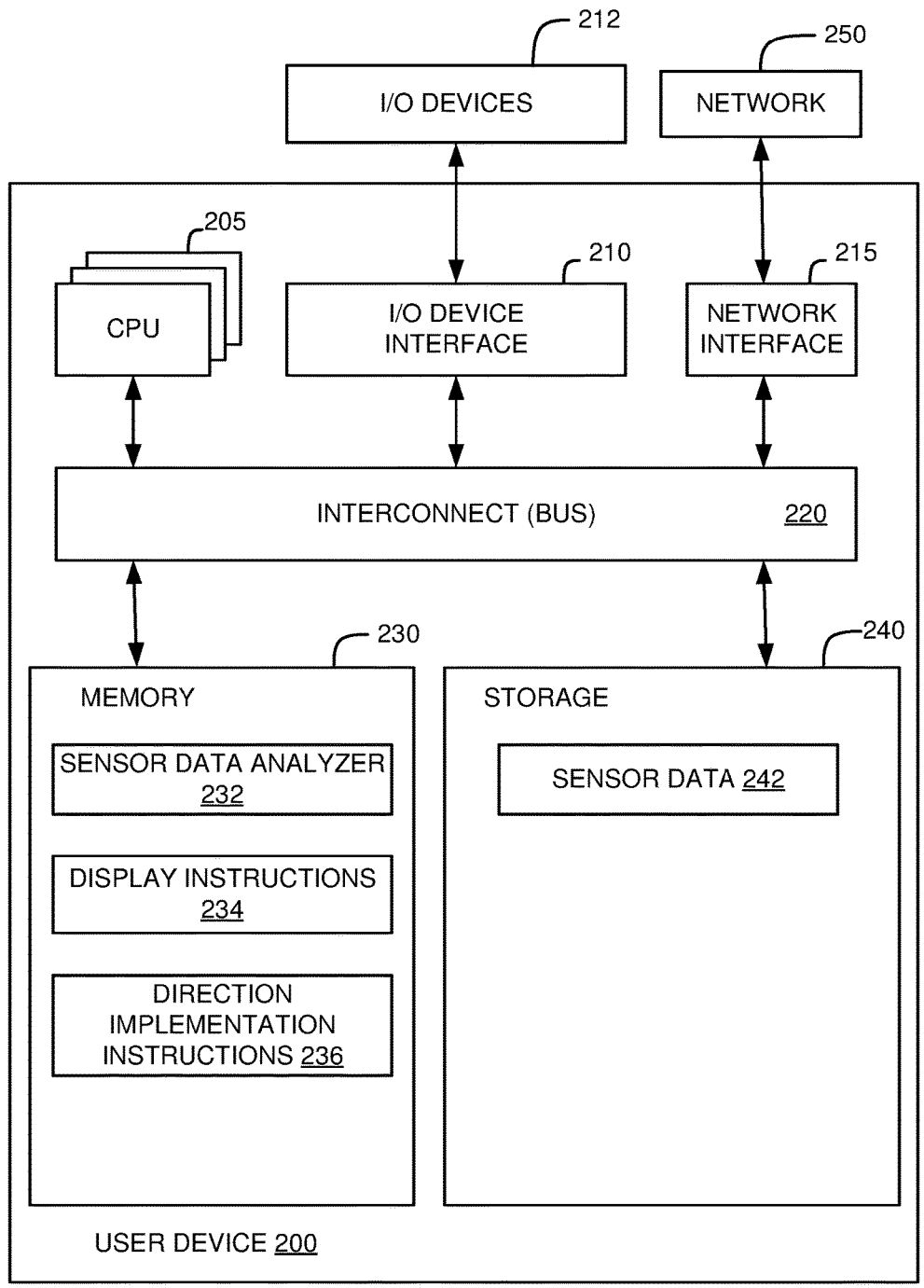
FIG. 2 illustrates a block diagram of an example user device, in accordance with some embodiments of the present disclosure.

Referring now to FIG. 2, illustrated is a block diagram of an example user device 200, in accordance with some embodiments of the present disclosure. In some embodiments, user device 200 performs one or more operations in accordance with FIG. 5 as described below. The user device 200 can include one or more processors 205 (also referred to herein as CPUs 205), an I/O device interface 210 which can be coupled to one or more I/O devices 212, a network interface 215, an interconnect (e.g., BUS) 220, a memory 230, and a storage 240. One or more components depicted in FIG. 2 can be combined or replaced by a microcontroller. Such microcontroller can, for example, contain one or more CPUs, memory, and programmable input/output peripherals. In embodiments employing a microcontroller, the discussion of the various components of user device 200 can apply instead to corresponding aspects of the microcontroller when applicable.

The form of user device 200 can vary in embodiments. In some embodiments, user device 200 can be a handheld device such as a tablet computer or smartphone, while in other embodiments, user device 200 can be a computerized device linked to a visor, goggles, glasses, or other facial display device. In some embodiments, user device 200 can be a computerized device which is attached to, or linked to, one or more firefighting tools, including a firehose or other fire extinguishing device. These possible forms of user device 200 are listed for example purposes only, and other forms will exist in other embodiments.

In some embodiments, each CPU 205 can retrieve and execute programming instructions stored in the memory 230 or storage 240. The interconnect 220 can be used to move data, such as programming instructions, between the CPUs 205, I/O device interface 210, network interface 215, memory 230, and storage 240. The interconnect 220 can be implemented using one or more busses. Memory 230 is generally included to be representative of a random access memory (e.g., static random access memory (SRAM), dynamic random access memory (DRAM), or Flash). In some embodiments, the memory 230 can be in the form of modules (e.g., dual in-line memory modules).

The storage 240 is generally included to be representative of a non-volatile memory, such as a hard disk drive, solid state device (SSD), removable memory cards, optical storage, or flash memory devices. In an alternative embodiment, the storage 240 can be replaced by storage area-network (SAN) devices, the cloud, or other devices connected to the user device 200 via the I/O devices 212 or a network 250 via the network interface 215.

The CPUs 205 can be a single CPU, multiple CPUs, a single CPU having multiple processing cores, or multiple CPUs with one or more of them having multiple processing cores in various embodiments. In some embodiments, a processor 205 can be a digital signal processor (DSP). The CPUs 205 can additionally include one or more memory buffers or caches (not depicted) that provide temporary storage of instructions and data for the CPUs 205. The CPUs 205 can be comprised of one or more circuits configured to perform one or more methods consistent with embodiments of the present disclosure.

The memory 230 of user device 200 includes sensor data analyzer 232, display instructions 234, and direction implementation instructions 236. Direction implementation instructions 236 may not be present in all embodiments. Sensor data analyzer 232 can be processor-executable instructions for analyzing data obtained from sensors, such as sensors A-D (104A through 104D of FIG. 1). This analysis can include many types of analysis in various embodiments and for various types of sensors. Possible types of analysis include calculating changes in data over time as firefighting techniques are applied to a situation, converting analog signals to digital signals, combining data received from multiple sensors, converting data to units a user is more familiar with (e.g. Celsius to Fahrenheit), tracking changes in sensor data over time, aggregating data received over time to construct a graph or map, preparing the data or portions of the data for display or other output, or any other form of analysis. Sensor data analyzer 232 can also include processor-executable instructions for managing the sensors (adjusting their locations or orientations, turning on or off their data collection, or managing any other task relating to the sensors) and/or for retrieving the data from the sensors.

Display instructions 234 can be processor-executable instructions for displaying various information to the user of user device 200. Information to display to the user of user device 200 can include raw data received from sensors, analyzed data from sensors, and/or firefighting suggestions, recommendations, and/or alerts received from a cognitive device, such as cognitive device 106. Display instructions 234 can provide this information in various ways in embodiments, including through a graphical user interface, through a display attached to a facial display (such as a visor, goggles, or glasses), or through audio presented through a headset or speaker.

Direction implementation instructions 236 can be processor-executable instructions for implementing directions received from the cognitive system, including from the cognitive device. In embodiments where the cognitive system can provide directions to the user device (for example: automatically adjusting the output pressure of a hose, changing the angle of spray, or changing a nozzle used), the user device will include direction implementation instructions 236 for carrying out the received directions. These direction implementation instructions 236 can vary in embodiments and may be limited in the functions that can be performed automatically. For example, while the cognitive system may be able to recommend to a firefighter that he or she lower her arms 6 inches to obtain a better target for the spray of water, direction implementation instructions 236 may not include the functionality to move the firefighter's arms. However, direction implementation instructions 236 may include, for example, instructions which provide user device 200 with the functionality to automatically adjust the nozzle of a linked firehose downwards 10 degrees to aim the spray of water at a better target. Direction implementation instructions 236 can include either or both of a user override feature which allows a user to prevent the user device from automatically implementing the received directions, or a user prompt which allows a user to select whether or not to implement the received directions.

Storage 240 contains sensor data 242. Sensor data 242 can be data gathered from sensors, such as sensors A-D (104A through 104D). Sensor data 242 can also be the sensor data after analysis by sensor data analyzer 232. The form and type of sensor data 242 will vary in embodiments depending on the types of sensors used and the types of analyses performed by sensor data analyzer 232. Possible examples include temperature data, humidity data, radiation data, other atmospheric data, pressure data, local position data or graphs of local position movements, velocity data, captured or processed images, video, or audio, breathing apparatus data, firefighter health data (including oxygen levels, temperature, pulse, and/or blood pressure), or any other data received or analyzed.

In some embodiments as discussed above, the memory 230 stores sensor data analyzer 232, display instructions 234, and direction implementation instructions 236, and the storage 240 stores sensor data 242. However, in various embodiments, each of the sensor data analyzer 232, display instructions 234, direction implementation instructions 236, and sensor data 242 are stored partially in memory 230 and partially in storage 240, or they are stored entirely in memory 230 or entirely in storage 240, or they are accessed over a network 250 via the network interface 215.

In various embodiments, the I/O devices 212 can include an interface capable of presenting information and receiving input. For example, I/O devices 212 can receive input from a user and present information to a user and/or a device interacting with user device 200.

In some embodiments, the network 250 is consistent with network 101 as described with respect to FIG. 1. The network 250 can connect (via a physical or wireless connection) the user device 200 with one or more devices (e.g., cognitive device 106 of FIG. 1) that interact with the user device.

Logic modules throughout the user device 200—including but not limited to the memory 230, the CPUs 205, and the I/O device interface 210—can communicate failures and changes to one or more components to a hypervisor or operating system (not depicted). The hypervisor or the operating system can allocate the various resources available in the user device 200 and track the location of data in memory 230 and of processes assigned to various CPUs 205. In embodiments that combine or rearrange elements, aspects and capabilities of the logic modules can be combined or redistributed. These variations would be apparent to one skilled in the art.

Figure 3:
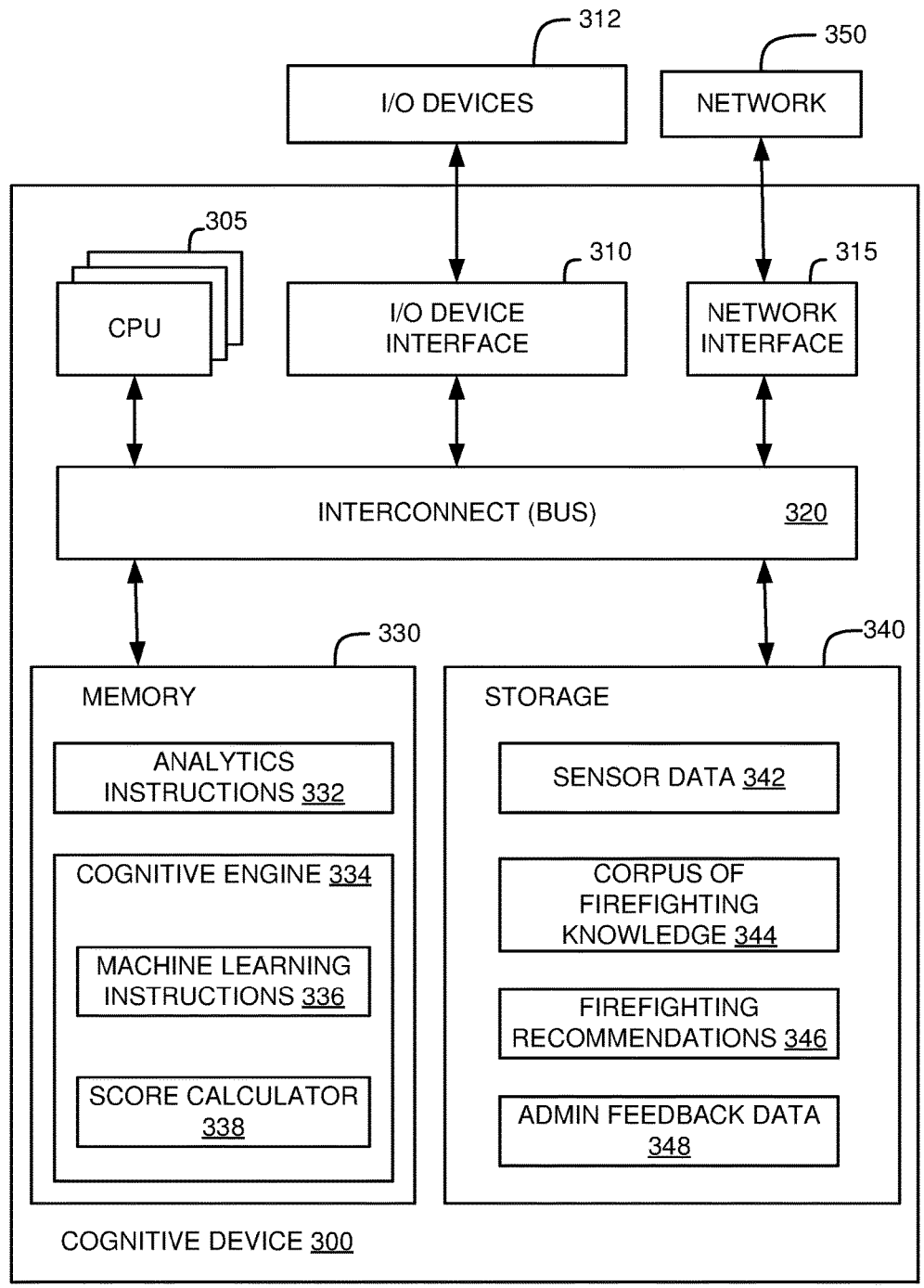
FIG. 3 illustrates a block diagram of an example cognitive device, in accordance with some embodiments of the present disclosure.

Referring now to FIG. 3, illustrated is a block diagram of an example cognitive device 300, in accordance with some embodiments of the present disclosure. In some embodiments, cognitive device 300 performs one or more operations in accordance with FIG. 5 as described below. The cognitive device 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash). In some embodiments, the memory 330 can be in the form of modules (e.g., dual in-line memory modules).

The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the cognitive device 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of cognitive device 300 includes analytics instructions 332, cognitive engine 334, machine learning instructions 336, and score calculator 338. Analytics instructions 332 can be processor-executable instructions for analyzing data obtained by cognitive device 300 from various sources. In some embodiments, cognitive device 300 can obtain data directly from sensors, such as sensors A-D (104A through 104D), and analytics instructions 332 will perform the functions described above with regard to sensor data analyzer 232. In other embodiments, cognitive device 300 can obtain the analyzed data from user device 200 and can perform further analysis as appropriate. Cognitive device 300 can also obtain data of other types and/or from other sources, including external feeds such as news reports or weather reports, data from more than one user device, historical data regarding past fires, expert input, and any other pertinent type of data or source. The analysis performed on the data obtained by cognitive device 300 can include many types of analysis in various embodiments and for various types of data obtained. Possible types of analysis include converting analog signals to digital signals, combining data received from multiple sources, converting data to units a user is more familiar with (e.g. Celsius to Fahrenheit), tracking changes in sensor data over time, aggregating data received over time to construct a graph or map, generating trends, weighting data based upon various factors (for example weighting techniques used by less experienced firefighters lower than those used by more experienced firefighters or weighting techniques used based upon a firefighter's performance record with higher weight to firefighters who generally achieve better outcomes), preparing the data or portions of the data for display or other output, or any other form of analysis.

Cognitive engine 334 can include machine learning instructions 336 and score calculator 338. Machine learning instructions 336 can be processor-executable instructions for utilizing the various inputs to cognitive device 300 and any stored data within cognitive device including any analyzed data created with analytics instructions 332 (including results of firefighting techniques), any admin provided feedback, prior generated firefighting recommendations, and any stored data. Collectively, the stored data will be referred to herein as the corpus of firefighting knowledge. Machine learning instructions 336 can use the inputs to cognitive device 300 and the corpus of firefighting knowledge to generate firefighting recommendations. In order to generate firefighting recommendations, machine learning instructions 336 can utilize the sensor data, any other inputs, and the corpus of firefighting knowledge to identify a firefighting goal. Possible firefighting goals include, but are not limited to, extinguishing a fire, lowering the temperature of a room to prevent an explosion, and stopping the spread of a fire to a location. Firefighting goals can be identified by comparing the current sensor data collected with prior sensor data and firefighting actions taken in response to the prior sensor data. In some embodiments, machine learning instructions 336 can generate firefighting directions, instead of or in addition to firefighting recommendations. Machine learning instructions 336 can be supervised machine learning instructions or unsupervised machine learning instructions in various embodiments.

In embodiments using supervised machine learning, cognitive engine 334 can be inputted with various training examples or data sets of example firefighting scenarios.

These training examples or data sets can include known firefighting goals with one or more good firefighting techniques which serve as correct answers to reach the firefighting goals. The training examples or data sets can also include ineffective or suboptimal firefighting techniques which serve as incorrect answers for reaching the firefighting goals. A training example or data set can include both correct and incorrect answers, or a range of answers in varying degrees of effectiveness. Machine learning instructions 336 can take these inputs and generate firefighting recommendations based upon the inputs. These firefighting recommendations can be compared with any provided correct answers in the form of known one or more good firefighting techniques. Additionally, or instead of such comparison, an admin can review the generated firefighting recommendations and provide feedback on how well these generated firefighting recommendations would work in practice. Multiple different firefighting recommendations or sets of firefighting recommendations can be outputted at once and scored or evaluated, including relative to the others. Machine learning instructions 336 will retain all of the data used and generated, including any admin feedback, adding it to the corpus of firefighting knowledge, and use this when presented with data from future firefighting scenarios. Over time, the corpus of firefighting knowledge, including all inputs, outputs, and admin feedback can grow and be continually enhanced, which machine learning instructions 336 will use to generate better and better firefighting recommendations.

In embodiments using unsupervised machine learning, cognitive engine 334 can be inputted with various training examples or data sets of example firefighting scenarios, without including known firefighting goals and either good or poor firefighting techniques as correct answers and without utilizing admin review. In these embodiments, machine learning instructions 336 similarly can take these inputs and generate firefighting recommendations based upon the inputs. Over time, cognitive engine 334 can cluster similar sets of inputs, firefighting goals, and the corresponding firefighting recommendations. Machine learning instructions 336 can compare the generated firefighting recommendations for each cluster, and the results of the implementation of these firefighting recommendations, to determine which firefighting recommendations are better than other firefighting recommendations in scenarios matching each cluster. Machine learning instructions 336 will retain all of the data used and generated, adding it to the corpus of firefighting knowledge, and use this when presented with data from future firefighting scenarios. Over time, the corpus of firefighting knowledge, including all inputs and outputs can grow and be continually enhanced, which machine learning instructions 336 will use to generate better and better firefighting recommendations.

Score calculator 338 can be processor-executable instructions for scoring the generated firefighting recommendations. In some embodiments, a firefighting recommendation with a higher score corresponds to a firefighting recommendation cognitive engine 334 has more confidence in, and in other embodiments, a lower score will correspond to higher confidence. Score calculator 338 can use a variety of algorithms in various embodiments. In some embodiments, score calculator 338 can take the outputted firefighting recommendations from machine learning instructions 336 and score them based upon their historical effectiveness. This historical effectiveness can be broken down into multiple components, such as water used, temperature reduction achieved, time until fire was extinguished, or any other variables indicating effectiveness of a firefighting technique. In some embodiments, scoring can be based upon ease of implementation, with firefighting recommendations of easier firefighting techniques given higher scores. In other embodiments, score calculator 338 can rely on admin input regarding firefighting recommendations or collect scores provided by admins. Score calculator 338 can employ multiple algorithms and generate weighted scores with outputs from one or more algorithms given higher weight than the outputs from other algorithms.

Storage 340 contains sensor data 342, corpus of firefighting knowledge 344, firefighting recommendations 346, and admin feedback data 348. Sensor data 342 can be data gathered from sensors, such as sensors A-D (104A through 104D) or can be the sensor data transmitted from one or more user devices. Sensor data 342 can also be the sensor data after analysis by sensor data analyzer 232 or analytics instructions 332. The form and type of sensor data 342 will vary in embodiments depending on the types of sensors used and the types of analyses performed by sensor data analyzer 232 and/or analytics instructions 332. Possible examples include temperature data, humidity data, radiation data, other atmospheric data, pressure data, local position data or graphs of local position movements, velocity data, captured or processed images, video, or audio, breathing apparatus data, firefighter health data (including oxygen levels, temperature, pulse, and blood pressure), or any other data received or analyzed. Sensor data 342 can also include trends in data received from one or more sources.

Corpus of firefighting knowledge 344 can include any data or inputs previously received or generated by cognitive device 300. Corpus of firefighting knowledge 344 can include previously received sensor data, previous firefighting goals, previous firefighting recommendations, previous external source data, and previous admin feedback. Corpus of firefighting knowledge 344 can be used by cognitive engine 334 when generating firefighting recommendations or directions.

Firefighting recommendations 346 can be the recommendations created by machine learning instructions 336. Firefighting recommendations 346 will vary in form in various embodiments. Some examples include recommendations that a firefighter use a particular chemical (water or other chemical) or tool, raise or lower a water (or other chemical) hose, sprayer, or applicator, adjust the angle of a water (or other chemical) hose, sprayer, or applicator, adjust the pressure of water (or other chemical) being outputted by a hose, sprayer, or applicator, approach or back away from the source of a fire, exit the area due to imminent threat perceived by the sensors, coordinate spray with one or more other firefighters, or any other action a firefighter may take during the course of firefighting. Firefighting recommendations 346 can contain or be coupled with scores relating to each of the firefighting recommendations, with the scores being created by score calculator 338 and indicating the relative confidence level of each firefighting recommendation.

Admin feedback data 348 can be data received from an admin device, such as admin device 108 or admin device 400. An admin can use such device to input criticism, alternative recommendations, alternative scoring, or any other input into the cognitive system to improve the firefighting recommendations 346 created by machine learning instructions 336 or alter the scores of firefighting recommendations scored by score calculator 338. Admin feedback data 348 can include tips to firefighters to be displayed with certain firefighting recommendations to aid a firefighter receiving such recommendation in completing the recommendation.

In some embodiments as discussed above, the memory 330 stores analytics instructions 332, cognitive engine 334, machine learning instructions 336, and score calculator 338, and the storage 340 stores sensor data 342, corpus of firefighting knowledge 344, firefighting recommendations 346, and admin feedback data 348. However, in various embodiments, each of the analytics instructions 332, cognitive engine 334, machine learning instructions 336, score calculator 338, sensor data 342, corpus of firefighting knowledge 344, firefighting recommendations 346, and admin feedback data 348 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with cognitive device 300.

In some embodiments, the network 350 is consistent with network 101 as described with respect to FIG. 1. The network 350 can connect (via a physical or wireless connection) the cognitive device 300 with one or more devices (e.g., user device 102 of FIG. 1) that interact with the cognitive device.

Logic modules throughout the cognitive device 300—including but not limited to the memory 330, the CPUs 305, and the I/O device interface 310—can communicate failures and changes to one or more components to a hypervisor or operating system (not depicted). The hypervisor or the operating system can allocate the various resources available in the cognitive device 300 and track the location of data in memory 330 and of processes assigned to various CPUs 305. In embodiments that combine or rearrange elements, aspects and capabilities of the logic modules can be combined or redistributed. These variations would be apparent to one skilled in the art.

Figure 4:
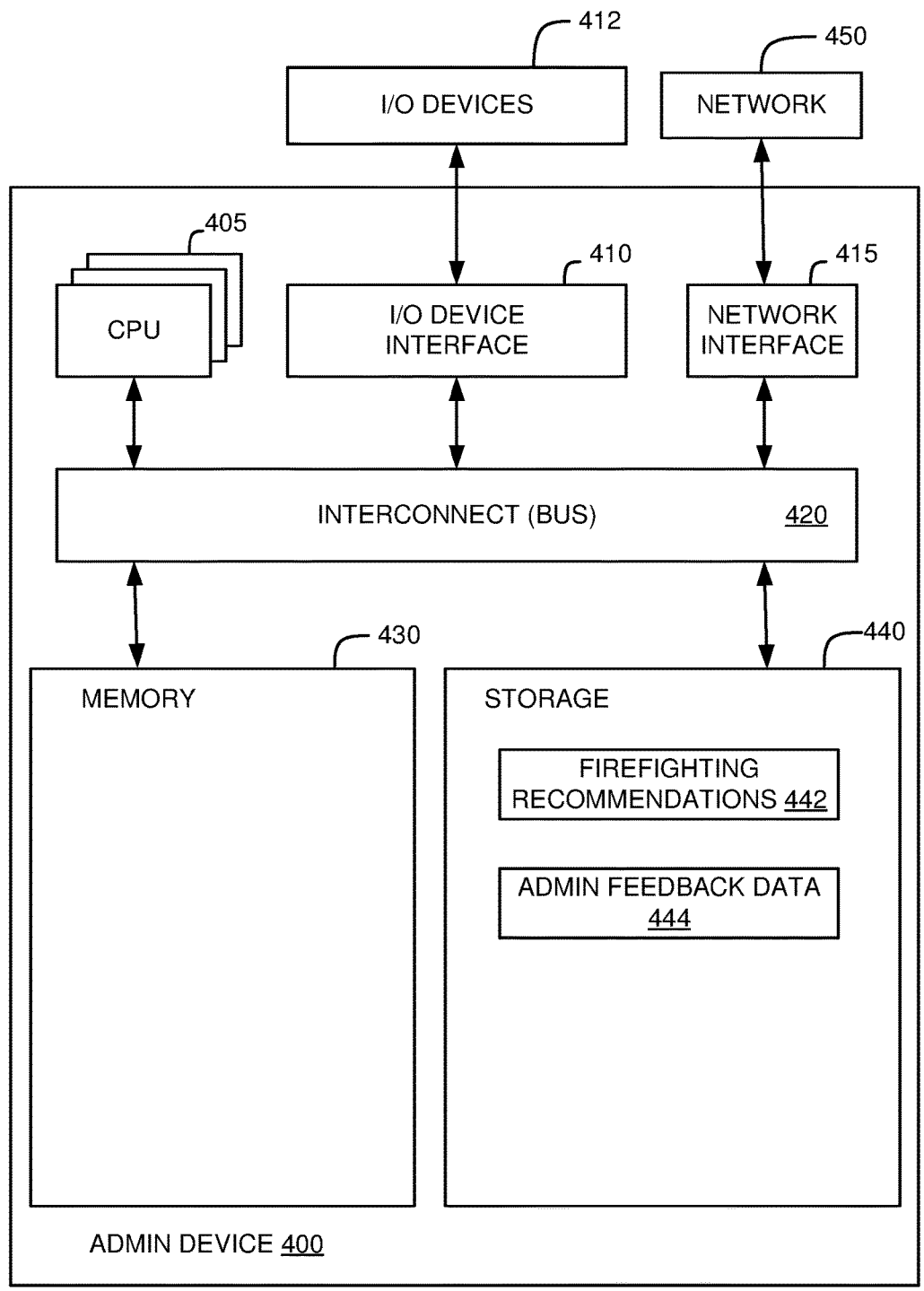
FIG. 4 illustrates a block diagram of an example admin device, in accordance with some embodiments of the present disclosure.

Referring now to FIG. 4, illustrated is a block diagram of an admin device 400, in accordance with some embodiments of the present disclosure. In some embodiments, admin device 400 performs one or more operations in accordance with FIG. 5 as described below. The admin device 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash). In some embodiments, the memory 430 can be in the form of modules (e.g., dual in-line memory modules).

The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the cognitive device 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

Storage 440 contains firefighting recommendations 442 and admin feedback data 444. Firefighting recommendations 442 can be a copy of firefighting recommendations 346 sent by cognitive device 300 to admin device 400 for admin review. Firefighting recommendations can also be or include alternate recommendations created by an admin, distinct from the recommendations created by cognitive device 300.

Admin feedback data 444 can be data prepared on admin device 400 by an admin. An admin can input criticism, alternative firefighting goals, alternative recommendations, alternative scoring, or any other input into the cognitive system to improve the firefighting recommendations created by machine learning instructions 336 or alter the scores of firefighting recommendations scored by score calculator 338. Admin feedback data 444 can include tips to firefighters to be displayed with certain firefighting recommendations to aid a firefighter receiving such recommendation in completing the recommendation. Admin feedback data 444 can be transmitted from admin device 400 to cognitive device 300 where it is stored as admin feedback data 348.

In some embodiments as discussed above, the storage 440 stores firefighting recommendations 442 and admin feedback data 444. However, in various embodiments, each of the firefighting recommendations 442 and admin feedback data 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a user and present information to a user and/or a device interacting with admin device 400.

In some embodiments, the network 450 is consistent with network 101 as described with respect to FIG. 1. The network 450 can connect (via a physical or wireless connection) the admin device 400 with one or more devices (e.g., cognitive device 106 of FIG. 1) that interact with the admin device.

Logic modules throughout the admin device 400—including but not limited to the memory 430, the CPUs 405, and the I/O device interface 410—can communicate failures and changes to one or more components to a hypervisor or operating system (not depicted). The hypervisor or the operating system can allocate the various resources available in the admin device 400 and track the location of data in memory 430 and of processes assigned to various CPUs 405. In embodiments that combine or rearrange elements, aspects and capabilities of the logic modules can be combined or redistributed. These variations would be apparent to one skilled in the art.

Figure 5:
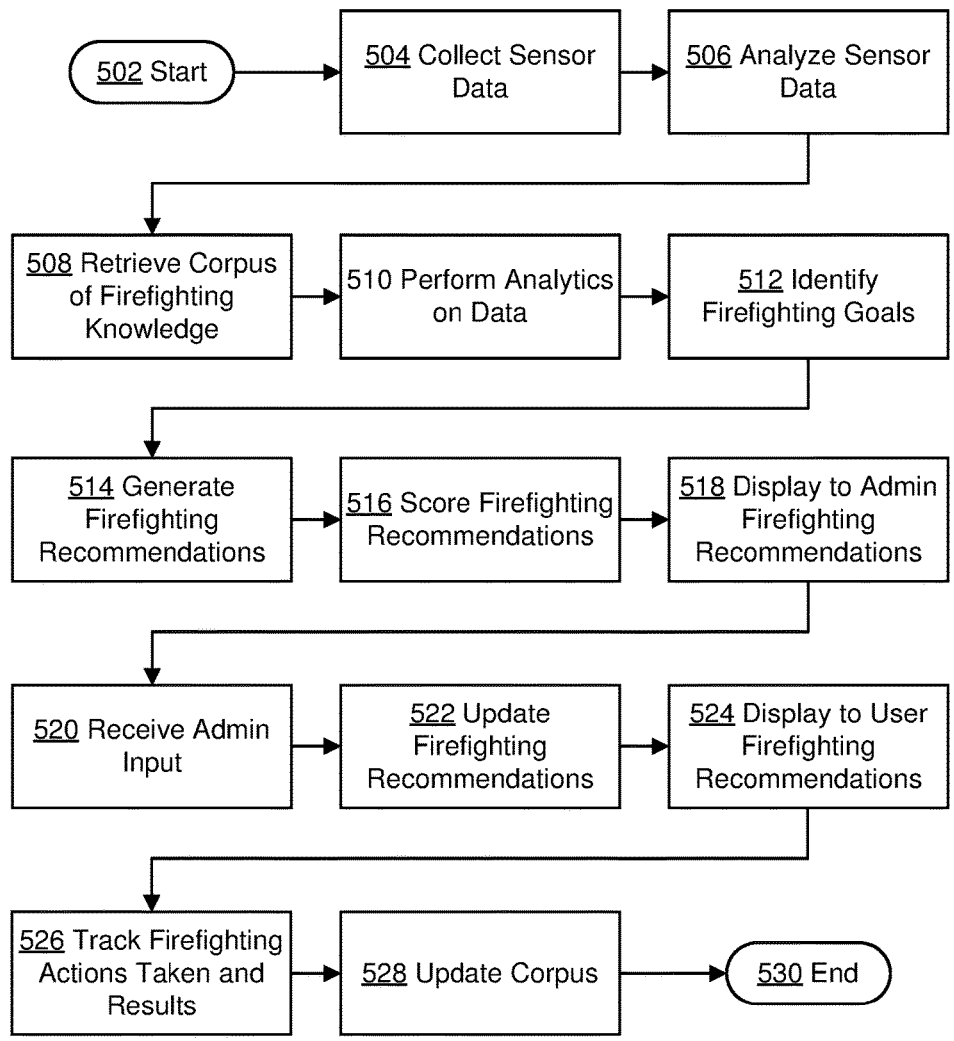
FIG. 5 depicts an example method for improving firefighting using a cognitive system, in accordance with embodiments of the present disclosure.

Referring now to FIG. 5, depicted is an example method 500 for improving firefighting using a cognitive system, in accordance with embodiments of the present disclosure. Method 500 can include more or less actions than those depicted. Method 500 can include actions in different orders than those depicted.

From start 502, the cognitive system collects sensor data at 504. The cognitive system can utilize a collection of sensors to gather real time data. Such sensors can be sensors A-D (104A through 104D) depicted in FIG. 1 and discussed above. The types and amounts of these sensors will vary in embodiments, and example types of sensors are discussed above with regard to sensors A-D (104A through 104D). Some or all of these sensors can be located on a firefighter's person or in their equipment. Some or all of these sensors can be deployed into or around the scene of the fire using a variety of methods, including by remote controlled devices, such as drones. Some buildings, sites of fires, or adjacent locations can have existing sensors present which can be utilized by the cognitive system. The existence, location, and accessibility of such sensors will vary.

In some embodiments, the cognitive system can collect data from sensors which are located in proximity to a fire site. Proximity to a fire site can vary in embodiments and possibilities include a distance requirement (for example: any sensors within 100 meters of the center of a fire site) or proximity can be configured by a user or admin to include a selected group of nearby sensors. The sensors can be located on more than one firefighter or device and their data aggregated. Multiple sensors of each type can be used as failsafes or backups in the event of sensor failure, or to obtain different readings depending on their location or orientation (for example temperature readings in various locations within a fire site). Many types of sensors can be envisioned by those skilled in the art and used in accordance with this disclosure; the listed types of sensors presented herein are not to be read as limiting. The data can be collected from the sensors by one or more user devices (such as user device 102 of FIG. 1 or user device 200 of FIG. 2), a cognitive device (such as cognitive device 106 of FIG. 1 or cognitive device 300 of FIG. 3), or both.

In some embodiments, the cognitive system can receive other input data beyond sensor data, including data from other input sources. Other potential sources of data include news articles, weather forecasts, real time weather information, videos or other information posted on social media sites related to the fire, emergency dispatch data, or any other data relevant to the fire. The other input data can also include historical data related to other fires of similar size, at similar buildings, with similar firefighters present, or any other historical data which may be relevant to the situation at hand. The other input data can also include human inputs, whether by firefighters at the scene, or by experts observing the sensors, the sensor data, and/or analyzed sensor data.

At 506, the cognitive system analyzes the data collected by the sensors. In various embodiments, various devices of the cognitive system can perform this analysis, including one or more user devices (such as user device 102 of FIG. 1 or user device 200 of FIG. 2), a cognitive device (such as cognitive device 106 of FIG. 1 or cognitive device 300 of FIG. 3), or both. This analysis can be performed by instructions such as sensor data analyzer 232 or analytics instructions 332, discussed above. Similarly, the types of analyses can be those discussed above with regard to sensor data analyzer 232 or analytics instructions 332. Possible types of analysis include converting analog signals to digital signals, combining data received from multiple sources, converting data to units a user is more familiar with (e.g. Celsius to Fahrenheit), tracking changes in sensor data over time, aggregating data received over time to construct a graph or map, generating trends, weighting data based upon various factors, preparing the data or portions of the data for display or other output, or any other form of analysis. Other forms of analyses or data manipulation can be performed by the cognitive system in addition to or instead of these example forms of analyses.

In embodiments where the cognitive system received other input data beyond sensor data, the cognitive system may additionally analyze this other data, together with, or separately from, the sensor data. The analytics on the other input data will vary in embodiments depending on the content and types of information included within the other input data. The analytics can include any of the forms of analysis described above or any other form of analysis or analytics. The analytics can also include determining similarities or differences between the sensor data, the analyzed sensor data, and/or the other input data.

At 508, the cognitive system retrieves the corpus of firefighting knowledge. The corpus of firefighting knowledge can include any data or inputs previously received or generated by the cognitive system. These data or inputs can include previously received sensor data, previous firefighting recommendations, previous external source data, and previous admin feedback. The corpus of firefighting knowledge may be stored within the cognitive system or retrieved from an external storage location, including a remote server or a cloud storage system.

At 510, the cognitive system performs analytics on the sensor data, any other input data, and the corpus of firefighting knowledge. The analytics performed will vary in embodiments depending on the content and types of information included within the sensor data, other input data, and the corpus of firefighting knowledge. The analytics can include any of the forms of analysis described above or any other form of analysis or analytics. The analytics can also include determining similarities or differences between the sensor data, the analyzed sensor data, the other input data, and the corpus of firefighting knowledge.

At 512, the cognitive system identifies firefighting goals. The cognitive system can utilize the sensor data, any other inputs, and the corpus of firefighting knowledge to identify a firefighting goal. Possible firefighting goals include, but are not limited to, extinguishing a fire, lowering the temperature of a room to prevent an explosion, and stopping the spread of a fire to a location. Firefighting goals can be identified by comparing the current sensor data collected with prior sensor data and firefighting actions taken in response to the prior sensor data. Firefighting goals can also be identified by a firefighter, an admin, or any other user, or can be selected from a set of possible options.

At 514, the cognitive system generates firefighting recommendations based upon the analyzed sensor data, the firefighting goals, the corpus of firefighting knowledge, and the analytics performed at 510. The cognitive system can generate firefighting recommendations using machine learning techniques, whether supervised machine learning or unsupervised machine learning, as discussed above with regard to machine learning instructions 336. The generated firefighting recommendations will vary in form in various embodiments. Some examples of firefighting recommendations include recommendations that a firefighter use a particular chemical (water or other chemical) or tool, raise or lower a water (or other chemical) hose, sprayer, or applicator, adjust the angle of a water (or other chemical) hose, sprayer, or applicator, adjust the pressure of water (or other chemical) being outputted by a hose, sprayer, or applicator, approach or back away from the source of a fire, exit the area due to imminent threat perceived by the sensors, coordinate spray with one or more other firefighters, or any other action a firefighter can take during the course of firefighting. In some embodiments, instead of generating firefighting recommendations, the cognitive system will generate firefighting directions, for automatic implementation, rather than for recommendation to a firefighter.

At 516, the cognitive system scores the generated firefighting recommendations (or firefighting directions in embodiments employing firefighting directions). The cognitive system can score the generated firefighting recommendations using the corpus of firefighting knowledge and comparing the generated firefighting recommendations with information stored within the corpus. In some embodiments, a firefighting recommendation with a higher score corresponds to a firefighting recommendation the cognitive system has more confidence in, and in other embodiments, a lower score will correspond to higher confidence. The cognitive system can use a variety of algorithms in various embodiments. In some embodiments, the cognitive system can take the generated firefighting recommendations and score them based upon their historical effectiveness, which may be stored within the corpus of firefighting knowledge. This historical effectiveness can be broken down into multiple components, such as water used, temperature reduction achieved, time until fire was extinguished, or any other variables indicating effectiveness of a firefighting technique. Historical effectiveness can also correspond to the success rate at reaching prior firefighting goals. In some embodiments, scoring can be based upon ease of implementation, with firefighting recommendations of easier firefighting techniques given higher scores. In other embodiments, the cognitive system can rely on admin input regarding firefighting recommendations or collect scores provided by admins. The cognitive system can employ multiple algorithms and generate weighted scores with outputs from one or more algorithms given higher weight than the outputs from other algorithms.

At 518, the cognitive system displays the firefighting recommendations (or firefighting directions in embodiments employing firefighting directions) to an admin. In some embodiments, this action will be delayed and occur at a later time (such as after a firefighting mission has concluded and during a review of the mission), and the firefighting recommendations can be displayed first to a firefighter or user at the scene of the fire. In other embodiments, the firefighting recommendations can be displayed to various locations simultaneously and in the event of admin feedback, the firefighting recommendations can be modified in real time. When the cognitive system displays the firefighting recommendations, one or more firefighting recommendations can be presented, and if more than one, they can be presented as alternatives. The cognitive system can display with the firefighting recommendations the scores associated with those recommendations, such that the admin is aware of the associated confidence level of the cognitive system. The cognitive system can also display additional data, including any of the received sensor data, the analyzed sensor data, or any analytics or trends generated by the cognitive system. Any or all of this data can be updated in real time as new sensor data is received, new analyses are performed, and/or new analytics are performed.

At 520, the cognitive system receives admin input. An admin can input criticism, alternative firefighting goals, alternative recommendations, alternative scoring, or any other input into the cognitive system to improve the firefighting recommendations or alter the scores of firefighting recommendations. Admin input can include tips to firefighters to be displayed with certain firefighting recommendations to aid a firefighter receiving such recommendation in completing the recommendation. In embodiments where the firefighting recommendations are displayed to an admin at a later time, some of these example forms of input will be inapplicable and the input provided by the admin can be for the purpose of improving the cognitive system's ability to create appropriate firefighting recommendations and score them appropriately.

At 522, the cognitive system updates the firefighting recommendations and/or the scores associated with the firefighting recommendations based upon the admin input. This action may not be required in all circumstances, specifically if an admin does not provide any input or any input provided does not change the firefighting recommendations or the scores associated with the firefighting recommendations the cognitive system may not perform any updates. Additionally, this action will not be required in embodiments where the firefighting recommendations are displayed to an admin at a later time. In the event updates are required, in some embodiments, the cognitive system can take the admin input and generate new firefighting recommendations and/or scores for the firefighting recommendations. In other embodiments, the cognitive system will apply the input provided by the admin without further generation or scoring.

At 524, the cognitive system displays the firefighting recommendations (or firefighting directions in embodiments employing firefighting directions) to a user or firefighter. When the cognitive system displays the firefighting recommendations, one or more firefighting recommendations can be presented, and if more than one, they can be presented as alternatives. The cognitive system can display with the firefighting recommendations the scores associated with those recommendations, such that the user or firefighter is aware of the associated confidence level of the cognitive system. The cognitive system can also display additional data, including any of the received sensor data, the analyzed sensor data, or any analytics or trends generated by the cognitive system. Any or all of this data can be updated in real time as new sensor data is received, new analyses are performed, and/or new analytics are performed.

In embodiments where firefighting directions are generated instead of recommendations, these directions can be transmitted to the firefighter or other user at 524 instead of recommendations. In some embodiments, these directions can be automatically implemented by a user device or a linked device without requiring human input. In other embodiments, these firefighting recommendations can be implemented upon a firefighter or other user accepting a prompt from the cognitive system to implement the direction. In other embodiments, the cognitive system can automatically implement the directions, but contain a user override feature, whereby a user can cancel or prevent the directions from being implemented.

At 526, the cognitive system tracks the firefighting actions taken and the results of those actions. The cognitive system can do so by collecting additional data from the sensors and determining the changes in values. In some embodiments, the cognitive system can provide a way for the user or firefighter to input their actions taken (which can occur after the firefighting mission has concluded). This can take the form of an option to select whether the user or firefighter followed one or more of the generated firefighting recommendations. In other embodiments, a user or firefighter can be allowed to input a description of their actions or select possible options presented by the cognitive system to the user or firefighter. The cognitive system may determine the results of the firefighting actions taken based upon changes in sensor values. In some embodiments, the results of the firefighting actions taken may be compared to information stored within the corpus of firefighting knowledge to determine an effectiveness or relative effectiveness of the firefighting actions taken.

At 528, the cognitive system updates the corpus of firefighting knowledge. The cognitive system can update the corpus of firefighting knowledge multiple times throughout method 500 or can do so in one action. Some or all of the data collected, analysis of that data, firefighting recommendations generated, admin input received, or any other data can be stored by the cognitive system. The cognitive system can use machine learning techniques, such as those discussed above with regard to machine learning instructions 336, to utilize the stored data in future implementations of method 500. After updating the corpus of firefighting knowledge at 528, method 500 ends at 530.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for improving firefighting, the method comprising:
   collecting, by a computer, sensor data from one or more sensors located in proximity to a fire site;
   analyzing, by the computer, the sensor data from the one or more sensors located in proximity to the fire site;
   receiving, by the computer, additional input data from a source selected from the group consisting of: news articles, weather forecasts, real time weather information, social media posts related to the fire, emergency dispatch data, and historical data related to other fires;
   analyzing, by the computer, the additional input data;
   retrieving, by the computer, a corpus of firefighting knowledge, wherein the corpus of firefighting knowledge comprises previously generated firefighting recommendations, previously collected sensor data, and previously collected admin input;
   performing, by the computer, analytics on the sensor data from the one or more sensors located in proximity to the fire site and the corpus of firefighting knowledge;
   identifying, by the computer and based on the sensor data from the one or more sensors located in proximity to the fire site, on the additional input data, and on the corpus of firefighting knowledge, one or more firefighting goals;
   generating, by the computer and based on the one or more firefighting goals and the corpus of firefighting knowledge and using supervised machine learning, one or more firefighting recommendations;
   scoring, by the computer and using the corpus of firefighting knowledge, the one or more firefighting recommendations based on historical effectiveness of prior firefighting actions;
   displaying, by the computer, the one or more firefighting recommendations to an admin;
   receiving, by the computer, input from the admin;
   updating, by the computer, the one or more firefighting recommendations based upon the input received from the admin;
   outputting, by the computer, the one or more firefighting recommendations to one or more devices;
   tracking, by the computer, one or more firefighting actions taken by a firefighter;
   collecting, by the computer, additional sensor data from one or more sensors located in proximity to the fire site;
   determining, by the computer, an effectiveness value for the one or more firefighting actions taken by the firefighter based upon comparison of a change in sensor data collected before and after the one or more firefighting actions with information within the corpus of firefighting knowledge; and
   updating, by the computer, the corpus of firefighting knowledge with data selected from the group consisting of sensor data from one or more sensors, analyzed data from the one or more sensors, analytics from the sensor data and the corpus of firefighting knowledge, firefighting recommendations, and scores of the one or more firefighting recommendations.

* * * * *